US012468632B2

United States Patent
Ibrahim et al.

(10) Patent No.: US 12,468,632 B2
(45) Date of Patent: Nov. 11, 2025

(54) METHOD FOR EMBEDDING ROWS PREFETCHING IN RECOMMENDATION MODELS

(71) Applicant: Advanced Micro Devices, Inc., Santa Clara, CA (US)

(72) Inventors: Mohamed Assem Abd Elmohsen Ibrahim, Santa Clara, CA (US); Onur Kayiran, Santa Clara, CA (US); Shaizeen Dilawarhusen Aga, Santa Clara, CA (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 19 days.

(21) Appl. No.: 17/835,810

(22) Filed: Jun. 8, 2022

(65) Prior Publication Data

US 2023/0401154 A1 Dec. 14, 2023

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
CPC .............. G06F 12/0862; G06F 2212/602
USPC ........................................................ 711/137
See application file for complete search history.

(56) References Cited

U.S. PATENT DOCUMENTS

| 10,915,447 | B1* | 2/2021 | Yau | G06F 12/0815 |
|---|---|---|---|---|
| 10,922,231 | B1* | 2/2021 | Gray | G06F 12/0895 |
| 2014/0289332 | A1* | 9/2014 | Frosst | G06Q 10/10 |
| | | | | 709/204 |
| 2019/0243766 | A1* | 8/2019 | Doerner | G06F 12/0862 |
| 2021/0157500 | A1* | 5/2021 | Gu | G06F 3/0613 |

OTHER PUBLICATIONS

Gupta et al., "The Architectural Implications of Facebook's DNN-based Personalized Recommendation", International Symposium on High-Performance Computer Architecture, Feb. 15, 2020, 14 pages, https://arxiv.org/pdf/1906.03109.pdf. [Retrieved Jun. 2, 2022].

(Continued)

*Primary Examiner* — Hua J Song
(74) *Attorney, Agent, or Firm* — Kowert, Hood, Munyon, Rankin & Goetzel, P.C.; Rory D. Rankin

(57) ABSTRACT

A system and method for efficiently accessing sparse data for a workload are described. In various implementations, a computing system includes an integrated circuit and a memory for storing tasks of a workload that includes sparse accesses of data items stored in one or more tables. The integrated circuit receives a user query, and generates a result based on multiple data items targeted by the user query. To reduce the latency of processing the workload even with sparse lookup operations performed on the one or more tables, a prefetch engine of the integrated circuit stores a subset of data items in prefetch data storage. The prefetch engine also determines which data items to store in the prefetch data storage based on one or more of a frequency of reuse, a distance or latency of access of a corresponding table of the one more tables, or other.

20 Claims, 7 Drawing Sheets

(56) References Cited

OTHER PUBLICATIONS

Hwang et al., "Centaur: A Chiplet-based, Hybrid Sparse-Dense Accelerator for Personalized Recommendations", Proceedings of the 47th IEEE/ACM International Symposium on Computer Architecture, May 12, 2020, 14 pages, https://arxiv.org/pdf/2005.05968.pdf. [Retrieved Jun. 2, 2022].
Ke et al., "RecNMP: Accelerating Personalized Recommendation with Near-Memory Processing", Proceedings of the ACM/IEEE 47th Annual International Symposium on Computer Architecture, Dec. 30, 2019, 14 pages, https://arxiv.org/pdf/1912.12953.pdf. [Retrieved Jun. 2, 2022].
Kwon et al., "TensorDIMM: A Practical Near-Memory Processing Architecture for Embeddings and Tensor Operations in Deep Learning", Proceedings of the 52nd Annual IEEE/ACM International Symposium on Microarchitecture, Aug. 25, 2019, 14 pages, https://arxiv.org/pdf/1908.03072.pdf. [Retrieved Jun. 2, 2022].
Naumov et al., "Deep Learning Recommendation Model for Personalization and Recommendation Systems", May 31. 2019, 10 pages, https://arxiv.org/pdf/1906.00091.pdf. [Retrieved Jun. 2, 2022].
Park et al., "Deep Learning Inference in Facebook Data Centers: Characterization, Performance Optimizations and Hardware Implications", Nov. 29, 2018, 12 pages, https://arxiv.org/pdf/1811.09886.pdf. [Retrieved Jun. 2, 2022].
Yin et al., "TT-Rec: Tensor Train Compression for Deep Learning Recommendation Models", Conference on Machine Learning and Systems, Jan. 25, 2021, 15 pages, https://arxiv.org/pdf/2101.11714.pdf. [Retrieved Jun. 2, 2022].

\* cited by examiner

METHOD FOR EMBEDDING ROWS PREFETCHING IN RECOMMENDATION MODELS

BACKGROUND

Description of the Relevant Art

Multilayer networks are used in a variety of applications in a variety of fields such as physics, chemistry, biology, engineering, social media, finance, and so on. Some of the applications that use multilayer networks are text recognition, image recognition, speech recognition, and recommendation systems. Multilayer networks classify data in order to provide an output value representing a prediction when given a set of inputs. The multilayer network uses multiple hidden layers of nodes (or neurons) between an input layer and an output layer of nodes. Each node has a specified activation function and a specified weight that is determined during training of the multilayer network. The nodes of the hidden layers, other than a last hidden layer, are not directly connected to the output layer.

Typically, a set of inputs for the multilayer network is represented as an encoded vector or batch of encoded vectors. This set of inputs is then combined with weights of a first hidden layer. The combination can use matrix multiplication. However, in various applications, the encoded vector is very sparse with only a few bits of the vector indicating an asserted value versus a vast majority of the bits indicating a negated value. In one example, a binary digit (bit) value of 1 indicates an asserted value, and a bit value of 0 indicates a negated value. A text recognition application receives a phrase or a sentence that includes only a few words of a text vocabulary list of tens of thousands of words or hundreds of thousands of words. A single word is represented by a single entry of a logical table that includes tens or hundreds of thousands of entries, each entry representing a word of the vocabulary. For example, the word "have" can be encoded to be the $1,016^{th}$ word of a 200,000-word vocabulary. The encoded vector is large. Additionally, the resulting output of a matrix multiplication or other combining operation for the first hidden layer includes a large number of values indicating a negated value.

In order to be more efficient, the multilayer network skips the matrix multiplication or other combining operation between the encoded input vector and the first hidden layer, and instead uses a lookup operation of one or more embedding tables. Each entry of an embedding table stores a vector of weights to be used in the first hidden layer. These weights were determined during the training of the multilayer. The matrix multiplication or other combining operation is replaced with the lookup operation of the one or more embedding tables. The lookup operation uses the encoded vector as an index.

Another example is an online music business using a recommendation system that utilizes a multilayer network to send to the user recommendations of songs. These recommendations can be similar to the songs that the user already downloaded. However, even when the user has downloaded hundreds or even thousands of songs, it is a small percentage of the millions of songs that the online music business provides for access. Therefore, an encoded input vector corresponding to the user is also very sparse with only a few bits of the vector indicating an asserted value. In this case, the encoded vector is so sparse that it is possible that more than 99 percent of the encoded vector indicates a negated value.

In addition, the recommendation system can use an input matrix that combines multiple input vectors of multiple users. The input matrix is used to allow neighboring vectors to affect a prediction or recommendation for the user. The more detailed are the vectors, the better the prediction or recommendation. For example, the vectors can include weights corresponding to features such as song categories (e.g., country, hip hop, jazz), song time periods, user ratings, and so on. However, as the number of features increase, as the number of users increase, and as the amount of available content (e.g., number of songs) increases, so does the number and size of the embedding tables increase. For example, the number of embedding rows (or rows) in each embedding table can reach multiple millions. Each time the multilayer network is utilized, a sparse lookup operation is performed on the embedding tables to locate a small percentage of the embedding rows. This sparse lookup operation increases the latency of the multilayer network to provide a prediction or recommendation as output.

In view of the above, efficient methods and systems for efficiently accessing sparse data for a workload are desired.

Figure 1:
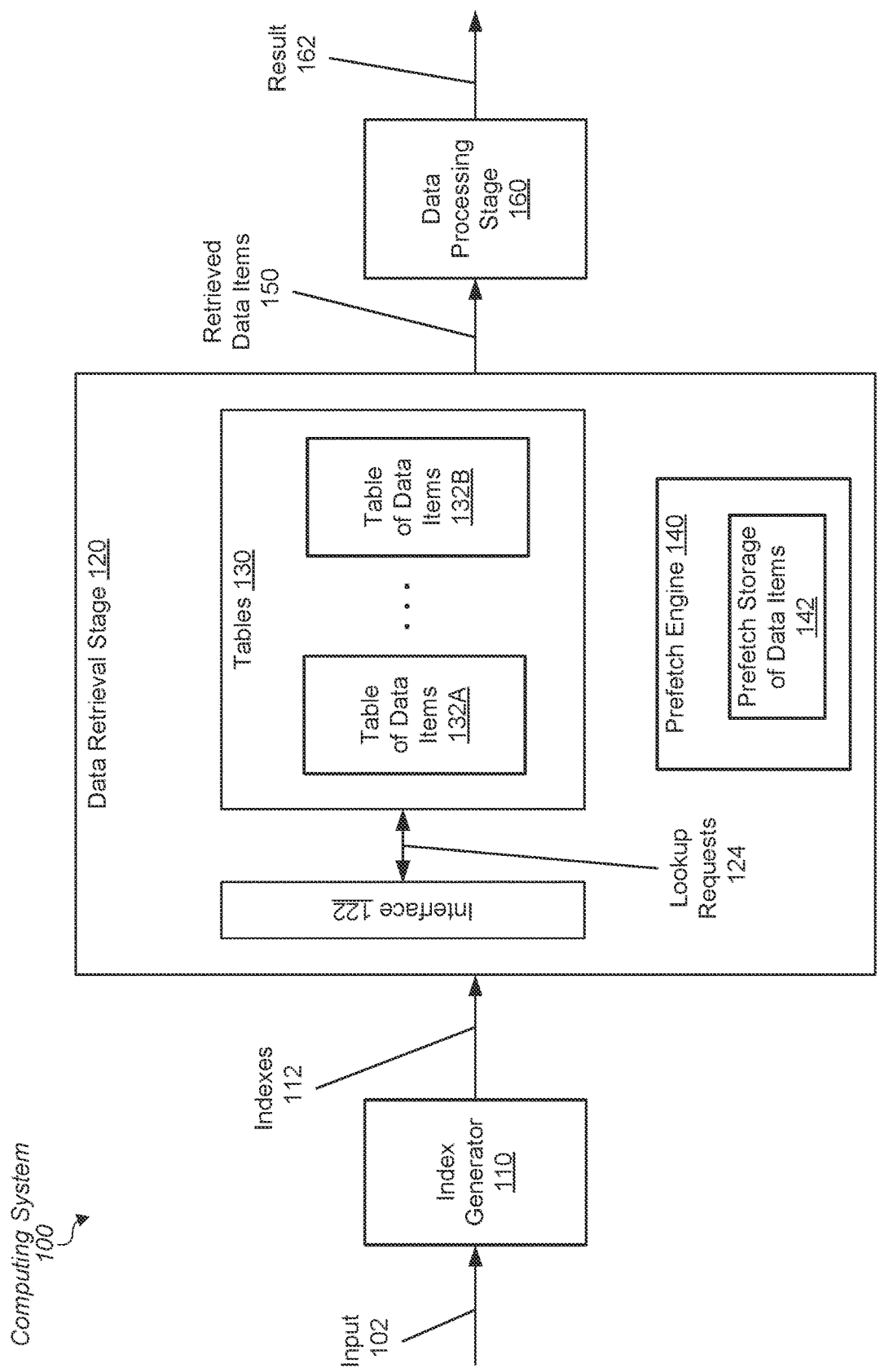
FIG. 1 is a generalized diagram of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently accessing sparse data for a workload are contemplated. In various implementations, a computing system includes an integrated circuit with an index generator, a data retrieval stage, and a data processing stage that combine to process a workload. The workload includes sparse accesses of data items stored in one or more data storage areas. In some implementations, one or more of the data storage areas are implemented as a table, organized as any of a variety of data structures, with multiple table entries. The data item represents a unit of data on which the data processing stage operates in initial data processing steps. The workload receives an input, and the data processing stage generates a result based on multiple data items targeted by one or more lookup requests generated based on the received input. One example of an input is a user query that includes a user identifier (ID) and a movie title that has a corresponding item ID, and a result is a selection (mouse click) probability on another movie title present on a web page. Another example of an input is an image file ID of an image file with an image to recognize, and the result is an indication of the contents of the image such as a cat, a sunset, or other.

In an implementation, the data item is a vector of weights with a known length that is operated on by a first hidden layer of a multilayer network. The multiple targeted data items are sparsely located across the entries of the one or more tables. Therefore, although data items can be stored in a contiguous manner in the one or more tables, the targeted data items are typically stored in a non-contiguous manner in the one or more tables. In some implementations, the table is implemented as a set of registers such as a set of flip-flop circuits, or as a row-based dynamic random access memory, or as a content addressable access memory (CAM), or other. For example, in other implementations, the table is implemented as one of a direct mapped cache, a set associative cache, a fully associative cache, a first-in-first-out (FIFO) buffer, a first-in-last-out (FILO) buffer, and a circular queue. It is possible and contemplated that the table is implemented with a variety of other data storage structures. As used herein, the term "table" is used to describe a data storage area in a memory subsystem with multiple entries or locations for storing data of a particular granularity. In an implementation, the particular granularity is the data item. Although the following description uses the term "table," it is noted that any one of a variety of data storage structures can be used to implement the table.

The index generator receives the lookup request and generates one or more indexes. The index generator sends the one or more indexes to the data retrieval stage. The data retrieval stage includes an interface that communicates with the one or more tables with each table including multiple entries. Each entry stores a data item. The data retrieval stage also includes a prefetch engine. The prefetch engine receives an index of the lookup request, and identifies, based on the index, a list of data item identifiers that specify multiple data items targeted by the lookup request. In an implementation, the list is stored in local data storage that is updated as lookup requests are processed. For example, a first lookup request, which has been processed, targeted ten data items stored in a sparse manner in the one or more tables. The prefetch engine stores a first list that identifies the ten data item identifiers that specify the ten data items both targeted by the first lookup request and stored in the one or more tables. For a second lookup request, the prefetch engine stores a second list that that identifies the ten data item identifiers that specify the ten data items both targeted by the second lookup request and stored in the one or more tables.

The prefetch engine determines a first group of data items of the targeted data items are stored in prefetch data storage. For example, the prefetch engine maintains another list of data item identifiers that specifies the data items that have copies stored in the prefetch data storage. In some implementations, the prefetch data storage is a cache or a subset of a cache used to store copies of data items. The prefetch engine retrieves the first group of data items from the prefetch data storage, rather than retrieve the first group of data items from the one or more tables. The prefetch engine sends the first group of data items to the data processing stage prior to data items not included in the first group of data items being retrieved from the one or more tables. Therefore, the latency of processing the workload reduces even with sparse lookup operations performed on the one or more tables.

The prefetch engine is also able to reorder one or more lists of data item identifiers corresponding to one or more other lookup requests. In an implementation, the prefetch engine maintains access statistics of data items, and reprioritizes the data item identifiers of a particular list based on the access statistics. The prefetch engine is also able to replace a first data item currently stored in the prefetch data storage with a second data item not stored in the prefetch data storage based on determining that a priority of the second data item is greater than a priority of the first data item.

In some implementations, the index generator, the data retrieval stage, and the data processing stage combine to form a multilayer network (or data model). The multilayer network classifies data in order to provide an output that represents a prediction when given a set of inputs. The multilayer network can be used in a variety of applications such as one of a variety of recommendation models. Recommendation systems are also referred to as recommender systems. A variety of applications rely on recommendation systems that predict a rating a user would give to an entity and generates one or more recommendations of one or more entities to present to the user. Examples of the entities are news feed posts provided by a variety of types of social media web pages, products to purchase provided by online businesses, and movies, videos, or songs provided by online entertainment providers.

Turning now to FIG. 1, a generalized diagram is shown of a computing system 100. The computing system 100 includes an index generator 110, a data retrieval stage 120, and a data processing stage 160 that combine to process a workload. The workload includes sparse accesses of data items stored in tables 132A-132B. The workload receives an input 102, and the data processing stage 160 generates a result 162 based on multiple, sparsely located data items targeted by the lookup requests 124. One example of the input 102 is a user query that includes a user identifier (ID) and a movie title that has a corresponding item ID, and the result 162 is a selection (mouse click) probability on another movie title present on a web page. Multiple other examples are also possible and contemplated. The data item represents a unit of data on which the data processing stage 160 operates in initial data processing steps.

The index generator 110 receives the input 102 and generates one or more indexes 112. An index of the indexes 112 identifies a particular entry of a particular table of the tables 132A-132B. The interface 122 generates one or more lookup requests 124 based on the indexes 112. The multiple data items targeted by the lookup requests 124 are sparsely located across the entries of one or more of the tables 132A-132B. Therefore, although data items can be stored in a contiguous manner in the tables 132A-132B, the targeted data items are typically stored in a non-contiguous manner in one or more of the tables 132A-132B. Although two tables 132A-132B are shown, any number of tables storing data items are possible and contemplated.

In an implementation, the tables 130 are stored in lower-level memory such as a lower-level cache (e.g., a level three, L3, cache), system memory, disk storage, or remote memory accessed via a network. In various implementations, the functionality of one or more of the index generator 110, the interface 122, the prefetch engine 140, and the data processing stage 160 are implemented on an integrated circuit. Examples of the integrated circuit are a central processing unit (CPU), a processor core of a CPU, an application specific integrated circuit (ASIC), a graphics processing unit (GPU), or other. In other implementations, the functionality of one or more of the index generator 110, the interface 122, the prefetch engine 140, and the data processing stage 160 are implemented on separate integrated circuits such as different processing units (dies) of a system on a chip (SoC), a multichip module (MCM), or other.

The prefetch engine 140 reduces the latency of processing the workload by maintaining storage of copies of data items in the prefetch storage 142, which avoids a sparse lookup operation in the tables 132A-132B for particular data items. Therefore, the retrieved data items 150 include data items retrieved from the prefetch storage 142 and data items retrieved from the tables 132A-132B. In some implementations, the data items retrieved from the prefetch storage 142 are sent ahead of the data items retrieved from the tables 132A-132B such that that data processing stage 160 can begin processing data earlier.

In some implementations, the index generator 110, the data retrieval stage 120, and the data processing stage 160 combine to form a multilayer network (or data model). The multilayer network classifies data in order to provide an output, such as the result 162, that represents a prediction when given the indexes 112 generated from the input 102. In one example, the input 102 is a user query that includes a user identifier (ID) and an identifier of a particular type of webpage of a social media website, and the result 162 is a selection (mouse click) probability on a web link of a news post or another user's profile presented on the web page. Another example of the input 102 is an image file ID of an image file with an image to recognize, and the result 162 is an indication of the contents of the image such as a dog, a particular type of vehicle, or other. The multilayer network can be used in a variety of applications such as one of a variety of recommendation models. In an implementation, the data item is a vector of weights with a known length that is operated on by a first hidden layer of a multilayer network where the first hidden layer is an initial data processing step of the data processing stage 160. In other implementations, the index generator 110, the data retrieval stage 120, and the data processing stage 160 combine to process other types of workloads that still use sparse lookup operations of data items.

The index generator 110 receives the input 102 and generates one or more indexes 112. In some implementations, an index of the indexes 112 includes a table identifier. In other implementations, an index of the indexes 112 includes an identifier that is mapped to a table identifier by the interface 122. The table identifier identifies one of the tables 132A-132B of the tables 130. Additionally, an index of the indexes 112 identifies a particular entry of an identified table. The interface 122 uses these identifiers when generating the lookup requests 124. In one case of multiple cases that the computing system 100 is a recommendation system, the input 102 is a user query and the indexes 112 are categorical, sparse input features identifiers. The categorical, sparse input features identifiers cause irregular memory accesses of the tables 132A-132B. The recommendation system uses both categorical, sparse input features identifiers and continuous, dense input features identifiers (not shown). Examples of categorical, sparse input features are a type of user's computing device, a user's preference of a genre of content (e.g., movie, song, clothing), a user's provided ranking of content, other users' rankings of similar content, and so on. Examples of continuous, dense input features are user profile information such as a user's age, an event data and time, a ticket price, and so on.

In an implementation in which the computing system 100 is used as a recommendation system, the continuous, dense, input features (not shown) of the input 102 bypass the tables 132A-132B, and are sent to the data processing stage 160 as another input (not shown). The categorical, sparse, input features of the input 102 are transformed into multiple vectors of weights with each vector of weights being referred to as an "embedding row." The data retrieval stage 120 performs this transformation by performing sparse lookup operations on the tables 132A-132B. Each entry of the tables 132A-132B stores an embedded row. The lookup operations performed by the data retrieval stage 120 are sparse lookup operations. In an example, an online music business uses a recommendation system, such as the computing system 100, that utilizes a multilayer network to send recommendations of songs to the user. The online music business can provide millions of songs available for access, but the individual user has accessed and possibly ranked only hundreds of songs. Therefore, the interaction between the individual user and the available songs is sparse.

The recommendation system, such as computing system 100, can generate a better result 162, which predicts a recommended song for the individual user, when a number of domains increase. Domains are also referred to as categorical input features. Examples of categorical input features are a genre of a movie, a time period portrayed by the movie, a time period of a movie's release, song categories (e.g., country, hip hop, jazz), song time periods, user ratings, and so on. As the number of categorical input features increase, the predicted recommendations provided as result 162 improve. However, the categorical input features are used to generate encoded input vectors representing the interaction between the individual user and the many categorical input features. As the number of categorical input features increase, and as the amount of available content (e.g., number of songs) increases, the encoded input vector becomes very sparse. Rather than perform matrix multiplication with very sparse encoded input vectors to generate a vector of weights to use in the data processing stage 160, these very sparse encoded input vectors are used as the indexes 112 to perform sparse lookup operations on the tables 132A-132B. As described earlier, each entry of a table of the tables 132A-132B can store a vector of weights, which is also referred to as an "embedding row." In such designs, the tables 132A-132B are referred to as "embedding tables."

As described earlier, in one case of many cases of the computing system 100 being a recommendation system, the continuous, dense input features are generated from the user query at a website, such as the input 102, bypass the tables 132A-132B, and are sent to the data processing stage 160 as another input (not shown). The categorical, sparse input features are the sparse encoded input vectors, which are the indexes 112 generated from the input 102, such the user query at the website. The sparse encoded input vectors, which are the indexes 112, are transformed into multiple vectors of weights with each vector of weights being referred to as an "embedding row." The data retrieval stage 120 performs this transformation of the sparse encoded input vectors by performing sparse lookup operations on the tables 132A-132B. The recommendation system, such as computing system 100, uses the data processing stage 160 to combine the transformed continuous, dense input features (not shown) with the retrieved data items 150. In this case, the retrieved data items 150 are the multiple vectors of weights (multiple embedding rows). Each data item is a copy of a single embedding row stored in one of the tables 132A-132B. The data processing stage 160 combines the received inputs, performs further data processing, and generates the result 162. In such a case, the result 162 is a predicted click-through rate (CTR). The click-through rate prediction provides a likelihood that a user clicks on a web page link indicating particular content such as an advertisement, a recommended song or movie, a recommended article of clothing, an appliance, or other.

The interface 122 of the data retrieval stage 120 receives the indexes 112, generates one or more lookup requests 124, and communicates with the tables 132A-132B. In some implementations, one or more of the tables 132A-132B are stored in system memory, which is not shown for ease of illustration. In other implementations, one or more of the tables 132A-132B are stored in remote memory located across a network. The interface 122 includes queues for storing requests and responses as well as circuitry for generating the lookup requests 124, scheduling issue of the lookup requests 124 to the tables 132A-132B, and scheduling issue of the responses to the data processing stage 160. In another implementation, another interface (not shown) is used between the tables 132A-132B and the data processing stage 160, which schedules issue of the responses of the lookup requests 124 to the data processing stage 160 and supports any communication protocol with the data processing stage 160. The circuitry of the interface 122 also supports particular communication protocols used to communicate with the tables 132A-132B, the prefetch engine 140, and any network. Each entry of the tables 132A-132B stores a data item. The tables 132A-132B store data using one of a variety of static random access memories and/or one of a variety of dynamic random access memories. As described earlier, the tables 132A-132B are located in system memory and/or in remote memory accessed via a network.

The data retrieval stage 120 also includes the prefetch engine 140. Similar to the interface 122, the prefetch engine 140 receives the indexes 112, and identifies, based on a particular index of the indexes 112, a list of data item identifiers that specify multiple data items targeted by the input 102. In an implementation, the list is stored in local data storage that is updated as lookup requests are processed. In one example, a first lookup request of the lookup requests 124, which has been processed, targeted ten data items (or ten embedding rows or ten vectors of weights) stored in a sparse manner in the tables 132A-132B. The prefetch engine 140 stores a first list that identifies the ten data item identifiers that specify the ten data items both targeted by the first lookup request and stored in the tables 132A-132B. For a second lookup request, the prefetch engine 140 stores a second list that identifies the ten data item identifiers that specify the ten data items both targeted by the second lookup request and stored in the tables 132A-132B.

The prefetch engine 140 determines a first group of data items of the targeted data items are stored in prefetch data storage 142. For example, the prefetch engine 140 maintains another list of data item identifiers that specifies the data items that have copies stored in the prefetch data storage 142. In some implementations, the prefetch data storage 142 is a cache or a subset of a cache used to store copies of data items. The prefetch engine 140 retrieves the first group of data items from the prefetch data storage 142, rather than retrieve the first group of data items from the tables 132A-132B. In some implementations, the prefetch engine 140 sends the first group of data items to the data processing stage 160 prior to data items not included in the first group of data items being retrieved from the tables 132A-132B. Therefore, the latency of processing the workload reduces even with sparse lookup operations performed on the tables 132A-132B.

Figure 2:
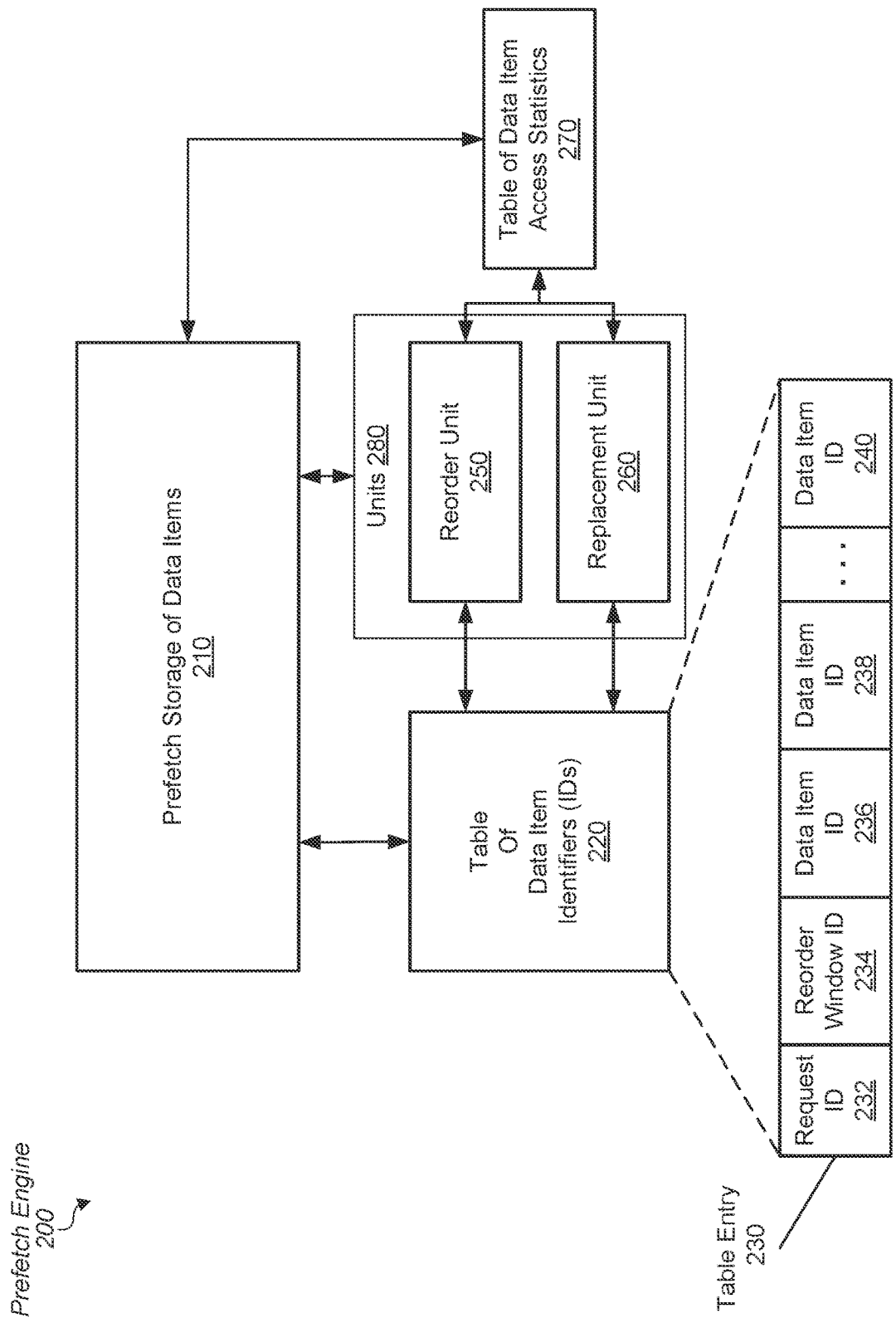
FIG. 2 is a generalized diagram of a prefetching engine.

Referring to FIG. 2, a generalized diagram is shown of a prefetch engine 200. The prefetch engine 200 includes prefetch data storage 210 of data items, a table 220 of data item identifiers (IDs), units 280 that include a reorder unit 250 and a replacement unit 260, and a table 270 of data item access statistics. The prefetch storage 210 of data items (or prefetch storage 210) stores data items that are fetched from external tables by sparse lookup operations. Examples of these tables are the tables 132A-132B of computing system 100 (of FIG. 1). The prefetch storage 210 stores a subset of these data items fetched from the external tables. Therefore, during processing of a subsequent lookup request that targets these data items, these targeted data items are retrieved from prefetch storage 210, rather than retrieved from the external tables.

In some implementations, a table is implemented as a set of registers such as a set of flip-flop circuits, or as a row-based dynamic random access memory, or as a content addressable access memory (CAM), or other. For example, in other implementations, the table is implemented as one of a direct mapped cache, a set associative cache, a fully associative cache, a first-in-first-out (FIFO) buffer, a first-in-last-out (FILO) buffer, and a circular queue. It is possible and contemplated that the table is implemented with a variety of other data storage structures. As described earlier, the term "table" is used to describe a data storage area in a memory subsystem with multiple entries or locations for storing data of a particular granularity. In an implementation, the particular granularity is the data item. Although the description of FIGS. 1-7 uses the term "table," it is noted that any one of a variety of data storage structures can be used to implement the table. For example, each of the prefetch data storage 210 (or prefetch storage 210), the table 220 of data item IDs, and the table 270 of data item access statistics is implemented as one of the variety of data storage structures described above or another type of data storage structure.

The table 220 of data item identifiers (or table 220) includes multiple table entries such as table entry 230. Table entry 230 includes multiple fields 232-240. Field 232 includes values that are used as an index into the table 220. In an implementation, the field 232 stores a lookup request identifier (ID) that is used to distinguish between multiple lookup requests. For example, in an implementation, one or more lookup requests are generated based on one or more indexes provided by a received input such as a user query. When multiple lookup requests are generated for performing multiple sparse accesses of the external tables, the field 232 stores the lookup request ID for distinguishing between these multiple lookup requests. In some implementations, the prefetch engine 200 is used in a recommendation system, and the field 232 stores a user query ID. Regardless of the system using the prefetch engine 200, the field 232 stores a unique ID that identifies a set of user inputs requesting data processing to be performed that requires sparse lookup operations for data to use during the data processing.

In some implementations, when a user lookup request is received by a system using the prefetch engine 200, the table 220 is initially accessed. If the user lookup request has been processed before, the request ID causes a hit in the table 220. Therefore, the list of data item IDs is already known. In various implementations, the table 270 of data item access statistics (or table 270) and the reorder unit 250 and the replacement unit 260 of the units 180 are aware of which data items corresponding to fields 236-240 of a particular table entry 230 are stored in the prefetch storage 210. In one implementation, the table entry 230 stores data item IDs in the fields 236-240 of only data items that have copies that have been stored in the prefetch storage 210. Therefore, if an input, such as a user query, causes the generation of lookup requests that target ten data items, and copies of four of these ten data items are stored in the prefetch storage 210, then the corresponding table entry 230 stores data item IDs for only the four data items that have copies stored in the prefetch storage 210. The table entry 230 does not store the data item IDs for the other six data items that do not have copies stored in the prefetch storage 210.

In another implementation, the table entry 230 stores data item IDs in the fields 236-240 of each targeted data item corresponding to the information of the request ID (e.g., request ID 7) stored in the field 232. Therefore, if an input, such as a user query, causes the generation of lookup requests that target ten data items, then the corresponding table entry 230 stores data item IDs for each of the ten data items even if copies of only four of these ten data items are selected for data storage in the prefetch storage 210. In such an implementation, a single-bit flag, a sub-field, a mask, or other indicator is used within or in combination with the fields 236-240 to indicate which four data items of the ten data items have been selected for the corresponding request ID to have copies stored in the prefetch storage 210. It is noted that these indications in the table entry 230 can also be stored in the table 270, and the values of these indications are used by one or more of the reorder unit 250 and the replacement unit 260. When determining a number of lookup requests to send to the external tables, the prefetch storage 210 is still searched using at least the data item ID. Therefore, a maximum of four data item IDs can be used for initially determining which data items of targeted data items to store in the prefetch storage 210 for a particular request ID, but over time, more than four of the targeted data items can be stored in the prefetch storage 210.

The table entry 230 stores the data item IDs for the other six data items that were not selected for data storage in the prefetch storage 210 for the particular request ID (e.g., request ID 7), but the indicator(s) indicate that these six data items were not selected to have copies stored in the prefetch storage 210 regarding the request ID (e.g., request ID 7) stored in the field 232. A particular data item (e.g., data item 89) of these six data items can be selected to have a copy stored in the prefetch storage 210 for another request ID (e.g., request ID 14) stored in another table entry of the table 220, although this particular data item (e.g., data item 89) was not selected to have a copy stored in the prefetch storage 210 regarding the request ID (e.g., request ID 7) stored in the field 232 of the particular table entry 230 used in the example.

It is also noted that at least a particular one of the four data items (e.g., data item ID 65) that already has an indication specifying that a copy of the data item (e.g., data item ID 65) is stored in the prefetch storage 210, can have an additional indicator set for another request ID (e.g., request ID 9) stored in another table entry of the table 220 that indicates that the data item (e.g., data item ID 65) has a copy stored in the prefetch storage 210. Although the table 220 can have two separate table entries (one table entry for request ID 7 and one table entry for request ID 9) that indicate a same, particular data item (e.g., data item ID 65) has a copy stored in the prefetch storage 210, only a single copy of the same, particular data item (e.g., data item ID 65) is stored in the prefetch storage 210. The access circuitry of the prefetch storage 210 supports multiple accesses of this single copy of the data item (e.g., data item ID 65) for multiple requests (such as at least request ID 7 and request ID 9). It is noted again that these indications in the table entry 230 can also be stored in the table 270, and the values of these indications are used by one or more of the reorder unit 250 and the replacement unit 260. When determining a number of lookup requests to send to the external tables, the prefetch storage 210 is still searched using at least the data item ID. In some implementations, the selection of which data items to store in the prefetch storage 210 for a particular request ID includes determining which data items had already been selected by previous requests for data storage in the prefetch storage 210. In this implementation, there won't be two table entries in table 220 for request ID 7 and request ID 9 that indicate data item ID 65 is selected for data storage in prefetch storage 210.

It is also noted that, in an implementation, the table 270 can be arranged in a similar manner as table 220, but include additional fields for the data items corresponding to the data item IDs. Therefore, similar to the table 220 and the units 280, the table 270 is aware of which data items corresponding to fields 236-240 of a particular table entry 230 are stored in the prefetch storage 210. Using the knowledge of the reorder unit 250, the prefetch engine 200 can communicate with an external index generator, and indicate that only a subset of the indexes is needed to be generated. For example, only the subset of the targeted data items not stored in the prefetch storage 210 require indexes to be sent to the external tables.

The field 234 stores a reorder window ID that identifies a subset of table entries of table 220. Within this subset of table entries identified by the reorder window ID, an order of processing targeted data items is changed based on which particular data items are stored in the prefetch storage 210. The reorder unit 250 performs the changing of the processing order that begins with data retrieval of the targeted data items. Fields 236-240 stores data item IDs that are targeted by a lookup request identified by the field 232. Each of the reorder unit 250 and the replacement unit 260 of the units 280 include circuitry that accesses one or more of the prefetch storage 210, the table 220 and the table 270.

The reorder unit 250 is aware of which data items corresponding to fields 236-240 are stored in the prefetch storage 210. In some implementations, the reorder unit 250 maintains a list of a subset of the data item IDs stored in fields 236-240 that have data items stored in the prefetch storage 210. In other implementations, the table entry 230 includes a flag or other indication that specifies the subset of the data item IDs stored in fields 236-240 that have data items stored in the prefetch storage 210. Additionally, the reorder unit 250 maintains a prioritized list of the data item IDs stored in fields 236-240. The prioritized list indicates an order of data processing that begins with data retrieval of the targeted data items.

In an example, a request ID 236 targets data item IDs 16, 235, 984, . . . , 47, 12,612, and 3,089. The reorder unit 250 is aware that the data item IDs 984, 47, and 3,089 have corresponding data items stored in the prefetch storage 210. Therefore, the reorder unit 250 reorders the data retrieval to direct data retrieval steps for the data item IDs 984, 47, and 3,089 to access the prefetch storage 210 instead of the external tables. The remaining data retrieval steps for the data item IDs 16, 235, . . . , and 12,612 continue to access the external tables. In an implementation, the data retrieval of data items corresponding to the data item IDs 16, 235, 984, . . . , 47, 12,612, and 3,089 is performed in multiple pipeline stages or different clock cycles. For example, the separate data retrieval requests are issued across multiple clock cycles. In such a case, the reorder unit 250 can prioritize the data retrieval of data items stored in the prefetch storage 210 to occur first. In other cases, the reorder unit 250 can prioritize the data retrieval of data items stored in the prefetch storage 210 to occur last. Since the latency of data retrieval from the external tables is appreciably larger than the latency of data retrieval from the prefetch storage 210, the reorder unit 250 can prioritize starting the data retrieval from the external tables. The priority decision is based on design requirements such as whether the next stage of data processing is able to begin with only a subset of the targeted data items.

In some implementations, once the data items are retrieved from the prefetch storage 210 for the data item IDs 984, 47, and 3,089, the prefetch engine 200 sends these data items to a next stage of data processing without waiting for the data items to arrive for the remaining data item IDs 16, 235, . . . , and 12,612. In other implementations, the prefetch engine 200 waits for all of the data items to be retrieved before sending the data items to the next stage of data processing. The decision to wait or not is based on design requirements such as whether the next stage of data processing is able to begin with only a subset of the targeted data items. However, retrieving a smaller number of data items corresponding to the data item IDs stored in fields 236-240 from the external tables still reduces the latency of data retrieval. This reduced latency allows the next stage of data processing to begin sooner.

In some implementations, the reorder unit 250 performs reordering for the entire table 220, and therefore, the field 234 is not included in the table 220. In other implementations, the reorder unit 250 performs reordering for a subset of the table entries of the table 220 in order to more efficiently manage reordering. In an implementation, the size of the reorder window is fixed. In another implementation, the size of the reorder window is variable and is based on one or more of lookup request types such as one set of categorical, sparse input features versus another set, a time period or age of lookup requests, or other. After performing reordering for a particular lookup request, the reorder unit 250 updates access statistics in the table 270. In an implementation, the table 270 can be arranged in a similar manner as table 220, but include additional fields for the data items corresponding to the data item IDs. These additional fields can include access statistics such as a count of reuse within a time interval, an age or time period since a previous access, a specific latency or a range of latency of data retrieval, a distance to a corresponding external table that stores the data item, and so on. In another implementation, these access statistics are stored in the table 220 as additional fields, rather than in the separate table 270.

The replacement unit 260 accesses the above access statistics and determines which data items should be stored in the prefetch storage 210. As described earlier, in some implementations, the table entry 230 includes a single-bit flag, a sub-field, a mask, or other indicator within or in combination with the fields 236-240 to indicate which data items corresponding to fields 236-240 are stored in the prefetch storage 210. In other implementations, this information is provided in the table 270. The replacement unit 260 assigns a priority level to the data item IDs stored in fields 236-240 based on the access statistics. In some implementations, the replacement unit 260 assigns a higher priority level based on the count of reuse. Therefore, the prefetch storage 210 stores data items that are more frequently accessed.

In another implementation, the replacement unit 260 assigns a higher priority level based on the indication of latency of data retrieval from the external tables. Therefore, the prefetch storage 210 stores data items that have greater latencies of data retrieval from the external tables, and these latencies are reduced due to the data items having copies stored in the prefetch storage 210. In one implementation, the replacement unit 260 uses the indicator (e.g., a single-bit flag, a sub-field, a mask, or other) or other indications provided by one or more of the prefetch storage 210 and table 270, and updates priority levels of only data items that are stored in the prefetch storage 210. In another implementation, the replacement unit 260 does not use such an indicator, and updates priority levels of data items regardless of whether the data items are stored in the prefetch storage 210. In other implementations, the replacement unit 260 updates priority levels to higher levels for data items that are stored in the prefetch storage 210 compared to data items that are not stored in the prefetch storage 210. A variety of other factors and conditions for setting priority levels are possible and contemplated.

Within a reorder window, the replacement unit 260 can replace a first data item currently stored in the prefetch storage 210 with a second data item not stored in the prefetch storage 210 based on determining that a priority level (or priority) of the second data item is greater than a priority of the first data item. For example, for the particular request ID 236 that targets data item IDs 16, 235, 984, . . . , 47, 12,612, and 3,089, three of the data items are stored in prefetch storage 210 such as the data items corresponding to the data item IDs 984, 47, and 3,089. Over time, the access statistics are updated, and the replacement unit 260 can replace, in the prefetch storage 210, the data item corresponding to data item ID 47 with the data item corresponding to data item ID 3,089. Additionally, the replacement unit 260 can replace, in the prefetch storage 210, the data item corresponding to data item ID 47 with the data item corresponding to data item ID 6,883 that is not even targeted by the request ID 236. Rather, the data item corresponding to data item ID 6,883 is targeted by a separate request with request ID 243, which is included in the same reorder window.

Figure 3:
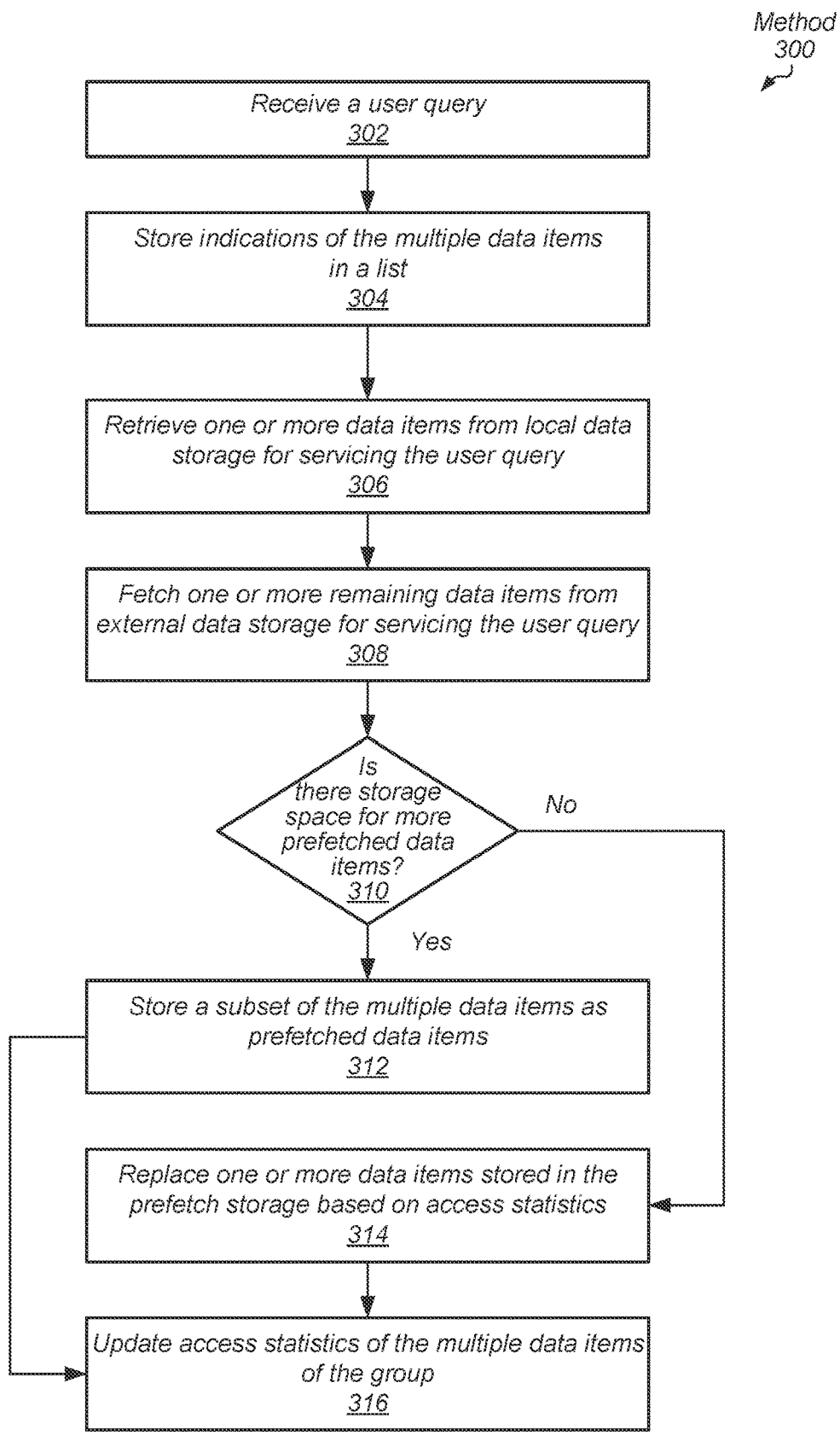
FIG. 3 is a generalized diagram of a method for efficiently accessing sparse data in multilayer networks.

Referring to FIG. 3, a generalized diagram is shown of a method 300 for efficiently accessing sparse data for a workload. For purposes of discussion, the steps in this implementation (as well as in FIG. 5) are shown in sequential order. However, in other implementations some steps occur in a different order than shown, some steps are performed concurrently, some steps are combined with other steps, and some steps are absent.

A computing system includes a memory for storing tasks of a workload that includes sparse memory accesses of data items stored in one or more tables. The computing system also includes circuitry of one or more processing units or other integrated circuits for processing the workload. In an implementation, the tables are stored in lower-level memory such as a lower-level cache (e.g., a level three, L3, cache), system memory, disk storage, or remote memory accessed via a network. The circuitry receives an input, such as a user query (block 302). To service the user query, the circuitry retrieves and processes multiple data items corresponding to the user query. In an implementation, the data item is a vector of weights with a known length that is operated on by a first hidden layer of a multilayer network. Each vector of weights is referred to as an "embedding row." Other examples of data items used during the processing of other workloads are possible and contemplated.

In an implementation, the circuitry includes an index generator that generates multiple indexes for the user query. The circuitry stores indications of the multiple data items in a list (block 304). For example, the circuitry includes a prefetch engine that has a table or other data storage that maintains lists of targeted data items for multiple user queries. This list is updated as user queries are processed. The prefetch engine also includes prefetch data storage (or local data storage) that provides local storage of copies of particular data items. The circuitry retrieves one or more data items from local data storage for servicing the user query (block 306). For example, the circuitry retrieves one or more data items from the local data storage of the prefetch engine.

The circuitry fetches one or more remaining data items from external data storage for servicing the user query (block 308). In one example, the user query needs ten data items to be retrieved and processed. The prefetch engine identifies four of the ten data items are stored in the local data storage. The prefetch engine provides an indication to data fetching circuitry that only six of the ten data items need to be fetched from the external data storage. The prefetch engine retrieves the identified four data items from the local data storage while the data fetching circuitry fetches the remaining six data items from the external data storage.

If there is available data storage space in the prefetch data storage ("yes" branch of the conditional block 310), then the circuitry stores a subset of the multiple data items as prefetched data items (block 312). A replacement unit of the prefetch engine determines for which data items to store copies in the prefetch data storage. When the user query is new, the replacement unit performs a default selection of the data items. In an implementation, the prefetch engine maintains a number of prefetched data items for a particular group. The group can include a number of lookup requests in a reorder window used by the prefetch engine as a partition of the total number of lookup requests having access statistics being maintained. In an implementation, the size of the reorder window is fixed. In another implementation, the size of the reorder window is variable and is based on one or more of lookup request types such as one set of categorical, sparse input features versus another set, a time period or age of lookup requests, or other.

If there is not available data storage space in the prefetch data storage ("no" branch of the conditional block 310), then the circuitry replaces one or more copies of data items stored in the prefetch storage based on access statistics (block 314). A replacement unit of the prefetch engine performs these steps. The replacement unit assigns a priority level to the data items. In some implementations, the replacement unit assigns a higher priority level based on a count of reuse. Therefore, the prefetch storage stores data items that are more frequently accessed.

In another implementation, the replacement unit assigns a higher priority level based on the indication of latency of data retrieval from the external tables. Therefore, the prefetch storage stores data items that have greater latencies of data retrieval from the external tables, and these latencies are reduced due to the data items having copies stored in the prefetch storage. Other factors for setting higher priority levels are possible and contemplated. The circuitry updates access statistics of the multiple data items as other lookup requests of the group are serviced (block 316). For example, the replacement unit tracks metadata for the targeted data items such as a frequency of reuse, an age of a most recent access, an access distance or an access latency of tables that store the data items, and so forth.

Figure 4:
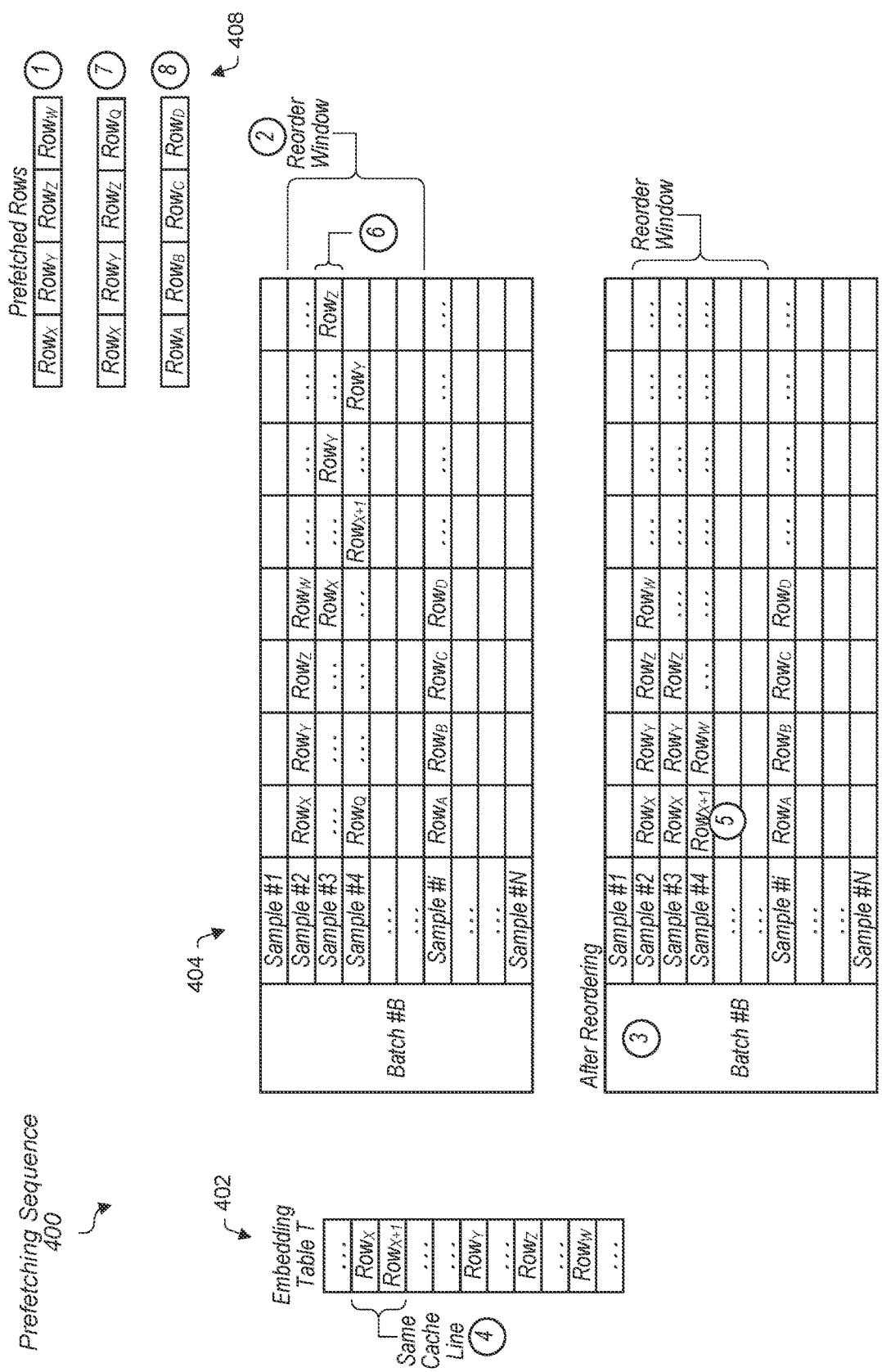
FIG. 4 is a generalized diagram of a prefetching sequence.

Referring to FIG. 4, a generalized diagram is shown of a prefetching sequence 400. The prefetching sequence 400 shows a sequence of steps at various points in time such as from step 1 to step 8. The steps are circled in the diagram. In the illustrated implementation, a prefetch engine supports four prefetched embedding rows, or rows. To further simplify the example, a single embedding table is shown although in other implementations, multiple embedding tables are accessed. The table 402 shows an embedding table that stores multiple rows such as at least $Row_X$, $Row_{X+1}$, $Row_Y$, $Row_Z$, and $Row_W$. The table 404 stores a list of data item identifiers for rows being accessed by particular set of inputs referred to as a Sample. The Sample includes one or more of a user query and corresponding indexes. The table 404 includes a number of samples used in a batch determined by a prior training stage of a multilayer network. Here, a sample is equivalent to a set of categorical, sparse input features. At step 1 (circled 1), a prefetch engine prefeteches rows X, Y, Z, and W (e.g., $Row_X$, $Row_Y$, $Row_Z$, and $Row_W$). These prefetched rows are stored in prefetch data storage 408 (or prefetch storage 408).

At step 2, the prefetch engine inspects the number of samples in a reorder window, and for these samples in the reorder window, reorders the sparse lookup operations per sample. The table 406 at step 3 shows the contents of table 404 after reordering has occurred. This reordering improves the access performance of the prefetch storage 408 by maximizing the temporal locality of the prefetched rows. If the embedding row size is smaller than a unit of storage, such as a cache line size, of the prefetch storage 408, then prefetching a given embedding row will cause the prefetching of other nearby rows. Therefore, prefetching $Row_X$ will cause $Row_{X+1}$ to be prefetched as well at step 4. At step during reordering, the $Row_{X+1}$ can also be reordered for a particular sample such as Sample #4. This reordering causes $Row_{X+1}$ to be processed first for Sample #4.

At step 6, a prefetched row that is not referenced again in the reorder window or a subset of the reorder window can be replaced by another row. In one example, $Row_W$ was not referenced again within a subset of the reorder window, and at step 7, $Row_W$ is replaced with $Row_Q$. After the samples within the reorder window are processed, a new prefetching cycle with a new reorder window begins at step 8. For example, at Sample #i, the prefetch engine prefetches rows A, B, C, and D (e.g., $Row_A$, $Row_B$, $Row_C$, and $Row_D$).

It is possible for the steps performed above to be executed by a same kernel or separate kernels. Helper threads can be issued to perform the above steps. The helper threads can be issued based on the idle resources in a CPU or a GPU. The helper threads perform the look ahead prefetching and reordering of the targeted data items (or rows). In an implementation, the command processor of a GPU performs the above steps. When the batches are available, such as during training of a multilayer network, the above steps are performed by preprocessing the available batches of samples. When only a subset of batches is available, such as during inference, the above steps (prefetching, reordering, and replacing) are periodically performed.

In some implementations, the prefetch engine uses the prefetch information of a previous reorder window when processing a current reorder window. In an implementation, the prefetch engine pins a prefetched embedding row in the prefetch storage, such as a cache, to ensure the reuse of the prefetched embedding row. The prefetch engine can operate the prefetch data storage as a bloom filter to reduce hardware overhead and complexity. The prefetch engine uses the embedding row index as a key to access and search the bloom filter. The priority level used by a replacement unit of the prefetch engine can have higher values for rows that are referenced more often. Alternatively, the replacement unit assigns higher priority levels to the less referenced rows as the higher referenced rows are more probable to be stored in a cache after fetching.

Since some embedding tables are accessed more often than other embedding tables, such as accessed by more lookup requests generated for servicing multiple user queries, the prefetch engine adjusts the number of prefetched rows and the number of samples per reorder window on a basis of the embedding tables, number of unique embedding rows requested, and available storage space in the prefetch storage. In other implementations, the prefetch engine inserts into the prefetch storage, such as a cache, prefetched rows with a high priority level with a higher level of protection such as inserted in a most-recently used position for a least-recently-used (LRU) cache replacement policy to avoid premature cache evictions. When the processing of samples of a batch completes, the prefetch engine sends an invalidation message to the cache for cache lines that correspond to single-use embedding rows among the samples of the batch.

Figure 5:
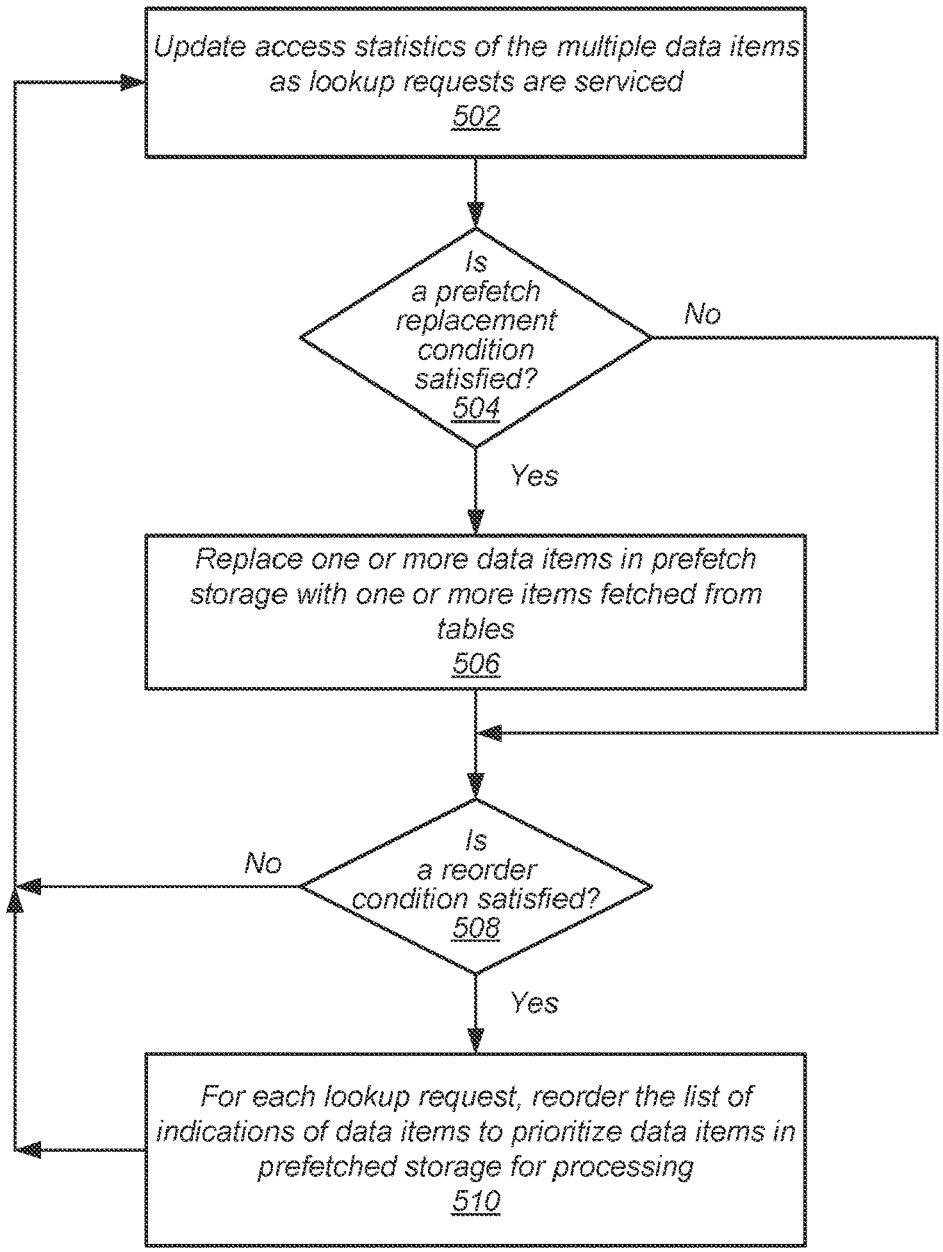
FIG. 5 is a generalized diagram of a method for efficiently accessing sparse data in multilayer networks.

Referring to FIG. 5, a generalized diagram is shown of a method 500 for efficiently accessing sparse data for a workload. A computing system includes a memory for storing tasks of a workload that includes sparse memory accesses of data items stored in one or more tables. The computing system also includes circuitry of one or more processing units or other integrated circuits for processing the workload. In an implementation, the tables are stored in lower-level memory such as a lower-level cache (e.g., a level three, L3, cache), system memory, disk storage, or remote memory accessed via a network. A prefetch engine updates access statistics of the multiple data items as lookup requests are serviced (block 502).

If the circuitry of the prefetch engine determines a prefetch replacement condition is satisfied ("yes" branch of the conditional block 504), then the prefetch engine replaces one or more data items in prefetch storage with one or more data items fetched from the tables (block 506). In an implementation, the replacement condition is a determination that a data item that is recently fetched from a table, but does not have a copy stored in the prefetch storage has a higher priority level (or priority) than a data item stored in the prefetch storage. A replacement unit of the prefetch engine assigns a priority level to the data items. In some implementations, the replacement unit assigns a higher priority level based on a count of reuse. Therefore, the prefetch storage stores data items that are more frequently accessed. In an implementation, the replacement unit uses an indicator (e.g., a single-bit flag, a sub-field, a mask, or other) or other indications provided by one or more of the prefetch storage and a table of access statistics, and updates priority levels of only data items that are stored in the prefetch storage. In another implementation, the replacement unit does not use such an indicator, and updates priority levels of data items regardless of whether the data items are stored in the prefetch storage. In other implementations, the replacement unit updates priority levels to higher levels for data items that are stored in the prefetch storage compared to data items that are not stored in the prefetch storage. A variety of other factors and conditions for setting higher priority levels are possible and contemplated.

In another implementation, the replacement unit assigns a higher priority level based on the indication of latency of data retrieval from the external tables. Therefore, the prefetch storage stores data items that have greater latencies of data retrieval from the external tables, and these latencies are reduced due to the data items having copies stored in the prefetch storage. Other factors for setting higher priority levels are possible and contemplated. In some implementations, the comparison of priority levels occurs between data items within a particular group such as a reorder window.

If the circuitry of the prefetch engine determines a prefetch reorder condition is satisfied ("yes" branch of the conditional block 508), then for each lookup request, the prefetch engine reorders the list of indications of items to prioritize items in prefetched storage for processing (block 510). The reorder unit of the prefetch engine is aware of which data items have copies stored in the prefetch storage. Therefore, the reorder unit reorders the data retrieval to direct data retrieval steps for these data items to access the prefetch storage instead of the tables. In some implementations, the reorder condition is determining a lookup request has been received for processing. In another implementation, the reorder condition is a determination that a particular time interval has elapsed. In yet another implementation, the reorder condition is a determination that a particular number of lookup requests have been processed. Other examples of a reorder condition are possible and contemplated.

Figure 6:
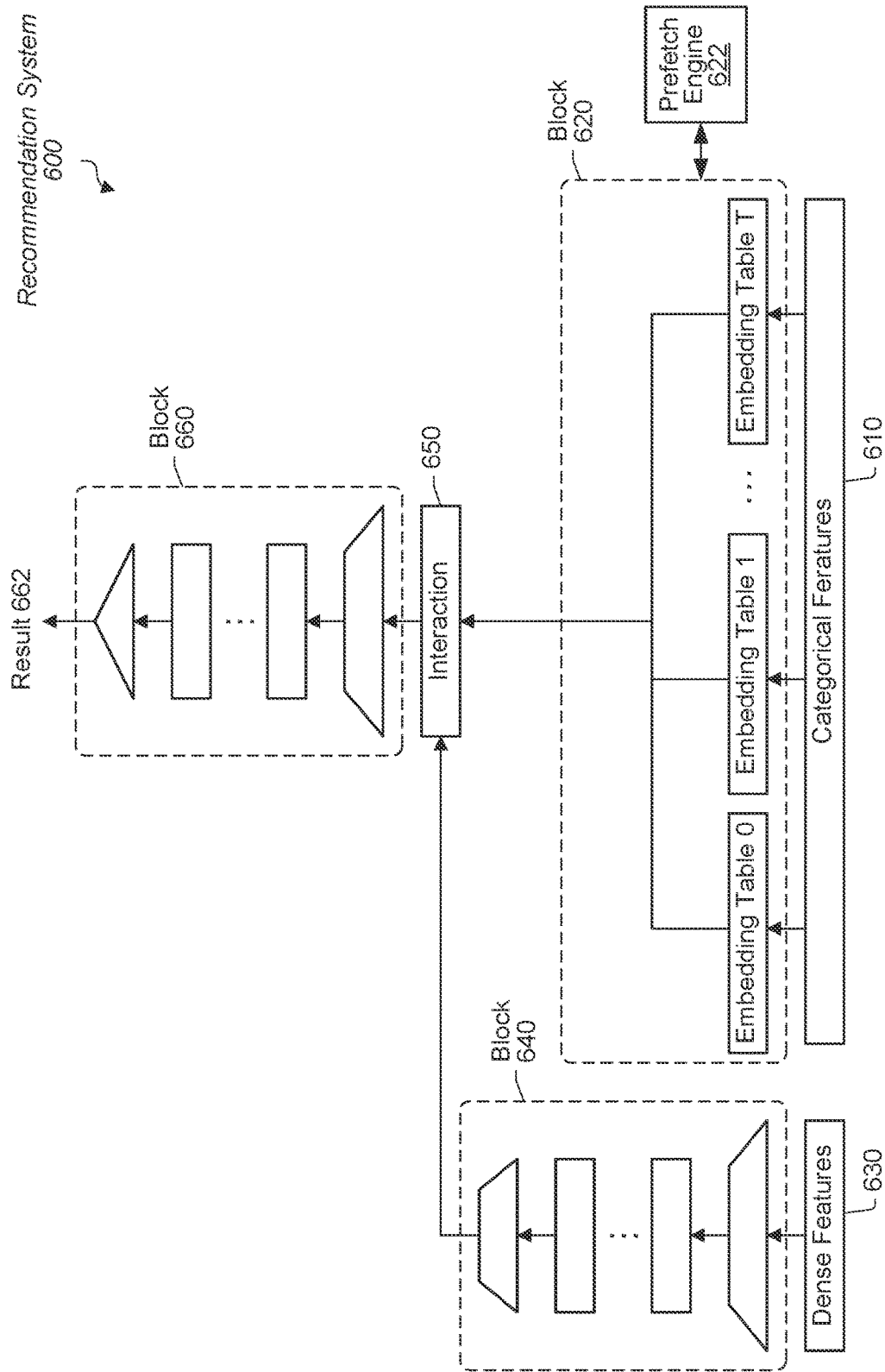
FIG. 6 is a generalized diagram of a recommendation system.

Referring to FIG. 6, a generalized diagram is shown of a recommendation system 600. The recommendation system 600 receives the inputs 610 and 630, and generates the result 662. To do so, in an implementation, the recommendation system includes the block 620 and the prefetch engine 622 for processing the inputs 610, the block 640 for processing the inputs 630, and the blocks 650 and 660 for processing the outputs of the blocks 620 and 640 to generate the result 662. The recommendation system 600 receives categorical, sparse input features 610 and continuous, dense input features 630. These input features 610 and 630 are generated from a user query. Examples of categorical, sparse input features 610 are a type of user's computing device, a user's preference of a genre of content (e.g., movie, song, clothing), a user's provided ranking of content, other users' rankings of similar content, and so on. Examples of continuous, dense input features 630 are user profile information such as a user's age, a user's gender, and so on. The recommendation system 600 combines the received inputs 610 and 630, performs further data processing, and generates the result 662. The result 662 is a predicted click-through rate (CTR). The click-through rate prediction provides a likelihood that a user clicks on a web page link indicating particular content such as an advertisement, a recommended song or movie, a recommended article of clothing, an appliance, or other.

Although particular components are described regarding the blocks 620, 640, 650 and 660, such as embedding tables and multilayer perceptrons (MLP), it is understood that the recommendation system 600 can include additional other components for generating the result 662. For example, in some implementations, the recommendation system 600 includes transformers, a recurrent neural network (RNN) structure, or other. In other implementations, a variety of other components not shown can be included in the recommendation system 600 for generating the result 662. Block 620 transforms the categorical, sparse input features 610 and the block 640 transforms the continuous, dense input features 630. The block 620 uses embedding tables to map each category to a dense representation before being sent into multilayer perceptrons (MLP) in block 660. Regarding the embedding tables, the main operation is one or more sparse table lookup operations and then reducing the retrieved embedding rows with addition, averaging, or other operations. Block 620 communicates with the prefetch engine 622 to reduce the latency of the sparse lookup operations. In various implementations, the prefetch engine 622 includes similar functionality as described earlier for the prefetch engine 140 (of FIG. 1) and the prefetch engine 200 (of FIG. 2).

The block 640 includes bottom MLP that directly receive the continuous, dense input features 630. The outputs of the blocks 620 and 640 are combined by the block 650 that determines an interaction between these outputs by performing one or more of a concatenation, a dot product operation, a sum, or other. The output of the block 650 is sent to the block 660, which includes top MLP. Block 660 generates the result 662.

Figure 7:
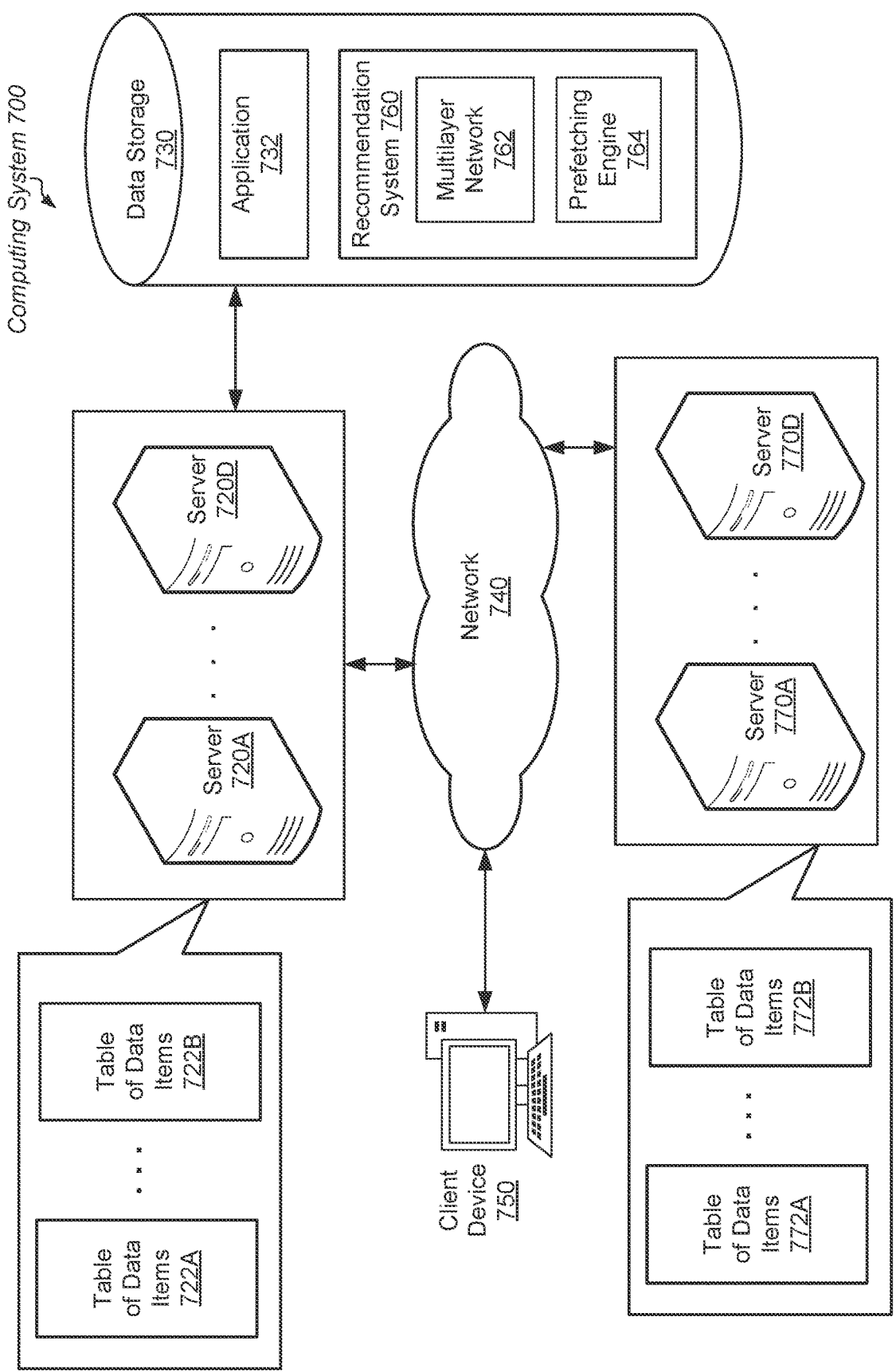
FIG. 7 is a generalized diagram of a computing system.

Turning now to FIG. 7, a generalized diagram is shown of a computing system 700. In the illustrated implementation, the computing system 700 includes the client computing device 750, a network 740, the servers 720A-720D, the servers 770A-770D, and the data storage 730 that includes a copy of a recommendation system 760. The recommendation system 760 includes a multilayer network 762 and a prefetch engine 764. In some implementations, the multilayer network 762 is one of a variety of deep learning recommendation models (DLRMs) that uses machine learning techniques based on data such as both continuous, dense input features and categorical, sparse input features. The recommendation system 760 is also referred to as a deep neural network (DNN) recommendation system. In some implementations, the recommendation system 760 implements the functionality of the recommendation system 600 (of FIG. 6). In various implementations, the prefetch engine 764 includes similar functionality as described earlier for the prefetch engine 140 (of FIG. 1) and the prefetch engine 200 (of FIG. 2).

Although a single client computing device 750 is shown, any number of client computing devices utilize an online business, such as application 732, through the network 740. The client device 750 includes hardware circuitry such as a processing unit 770 for processing instructions of computer programs. Examples of the client computing device 750, which is also referred to as the client device 750, is a laptop, a smartphone, a tablet computer, a desktop computer, or other. The client device 750 executes one of a variety of available World Wide Web browsers. The user searches, or "browses", sites on the World Wide Web ("Web") via Web browsers being executed on the client device 750. The user accesses Web pages for a variety of reasons such as performing business transactions, reading about news and current events, communicating through social networking sites, downloading entertainment content, performing research, and so forth. The application 732 is representative of an instance, or a copy, of an online business Web site. The user accesses content stored on the tables 722A-722B and 772A-772B while logged in to an account registered with the application 732. The application 732 uses the recommendation system 760 to provide recommendations to the user of the client device 750.

In implementations, the client device 750 includes a network interface (not shown) supporting one or more communication protocols for data and message transfers through the network 740. The network 740 includes multiple switches, routers, cables, wireless transmitters and the Internet for transferring messages and data. Accordingly, the network interface of the client device 750 support at least the Hypertext Transfer Protocol (HTTP) for communication across the World Wide Web. In some implementations, an organizational center (not shown) maintains the application 732 and the data stored on the tables 722A-722B and 772A-772B. In addition to communicating with the client device 750 through the network 740, the organizational center also communicates with the data storage 730 for storing and retrieving data. Through user authentication, users are able to access resources through the organizational center to update user profile information, access a history of purchases or other accessed content, and download content for purchase.

The servers 720A-720D include a variety of server types such as database servers, computing servers, application servers, file servers, mail servers and so on. In various implementations, the servers 720A-720D and the client device 750 operate with a client-server architectural model. In some implementations, one or more processors of the servers 720A-720D executes the recommendation system 760 including the prefetch engine 764. The one or more processors include hardware circuitry such as a parallel processing architected core and a general-purpose core as used in central processing units (CPUs). The parallel architected core can be a graphics processing unit (GPU), a digital signal processing unit (DSP) or other. The processor of one of the servers 720A-720D trains the multilayer network 762 using queries from users such as the user of the client device 750.

When the client device 750 generates a user query and sends it to at least an instance of the application 732, the trained recommendation system 760 performs sparse lookup operations on the tables 722A-722B and 772A-772B to retrieve data items as well as access prefetch storage of the prefetch engine 764. As shown, the tables 772A-772B are accessed via the network 740 after the user query is sent via the network 740. Therefore, the tables 772A-772B have a greater access latency than the tables 722A-722B. The prefetch engine 764 takes the larger access latencies into account as described earlier.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   a prefetch engine comprising circuitry, wherein responsive to receipt of a user query that targets two or more data items, the circuitry is configured to:
      retrieve, from a prefetch data storage, a first group of one or more data items of the two or more data items, identified as being stored in the prefetch data storage;
      send the first group of data items to a data processing stage comprising processing circuitry, prior to sending remaining data items of the two or more data items;
      retrieve, from a data storage different from the prefetch data storage, a second group of one or more data items of the two or more data items, identified as not being stored in the prefetch data storage; and
   send the second group of data items to the data processing stage.

2. The integrated circuit as recited in claim 1, wherein each of the first group of data items is stored in a non-contiguous manner.

3. The integrated circuit as recited in claim 1, wherein the prefetch engine is further configured to reorder a priority of data processing of a list of a plurality of data item identifiers specifying data items targeted by a given user query, wherein reordering is based on access statistics of data items currently stored in the prefetch data storage.

4. The integrated circuit as recited in claim 1, wherein the prefetch engine is further configured to replace a first data item currently stored in the prefetch data storage with a second data item not stored in the prefetch data storage based on determining that a priority of the second data item is greater than a priority of the first data item.

5. The integrated circuit as recited in claim 4, wherein a priority of a given data item is based on a frequency of reuse of the given data item by a plurality of user queries.

6. The integrated circuit as recited in claim 4, wherein a priority of a given data item is based on an access latency of a corresponding one of a data storage area that stores the given data item.

7. The integrated circuit as recited in claim 1, wherein:
   data storage areas targeted by the user query are embedding tables configured to store embedding vectors used by a data model implementing a neural network; and
   each data item is an embedding vector.

8. A method comprising:
   responsive to receiving a user query that targets two or more data items:
      retrieving, from a prefetch data storage, a first group of one or more data items of the two or more data items, identified as being stored in the prefetch data storage;
      sending the first group of data items to a data processing stage comprising processing circuitry, prior to sending remaining data items of the two or more data items;
      retrieving, from a data storage different than the prefetch data storage, a second group of one or more data items of the two or more data items, identified as not being stored in the prefetch data storage; and
      sending the second group of data items to the data processing stage.

9. The method as recited in claim 8, wherein each of the first group of data items is stored in a non-contiguous manner.

10. The method as recited in claim 8, further comprising reordering a priority of data processing of a list of a plurality of data item identifiers specifying data items targeted by a given user query, wherein reordering is based on access statistics of data items currently stored in the prefetch data storage.

11. The method as recited in claim 8, further comprising replacing a first data item currently stored in the prefetch data storage with a second data item not stored in the prefetch data storage based on determining that a priority of the second data item is greater than a priority of the first data item.

12. The method as recited in claim 11, further comprising assigning a priority of a given data item based on a frequency of reuse of the given data item by a plurality of user queries.

13. The method as recited in claim 11, further comprising assigning a priority of a given data item based on an access latency of a data storage area that stores the given data item.

14. The method as recited in claim 8, wherein:
   data storage areas targeted by the user query are embedding tables configured to store embedding vectors used by a data model implementing a neural network; and
   each data item is an embedding vector.

15. A computing system comprising:
   a memory configured to store instructions of one or more tasks and source data to be processed by the one or more tasks;
   an integrated circuit configured to execute the instructions using the source data, wherein the integrated circuit comprises:
      a prefetch engine comprising circuitry, wherein responsive to receipt of a user query that targets two or more data items, the circuitry is configured to:
         retrieve, from a prefetch data storage, a first group of one or more data items of the two or more data items, identified as being stored in the prefetch data storage;

send the first group of data items to a data processing stage comprising processing circuitry, prior to sending remaining data items of the two or more data items;

retrieve, from a data storage different than the prefetch data storage, a second group of one or more data items of the two or more data items, identified as not being stored in the prefetch data storage; and send the second group of data items to the data processing stage.

16. The computing system as recited in claim 15, wherein each of the first group of data items is stored in a non-contiguous manner.

17. The computing system as recited in claim 15, wherein the prefetch engine is further configured to reorder a priority of data processing of a list of a plurality of data item identifiers specifying data items targeted by a given user query, wherein reordering is based on access statistics of data items currently stored in the prefetch data storage.

18. The computing system as recited in claim 15, wherein the prefetch engine is further configured to replace a first data item currently stored in the prefetch data storage with a second data item not stored in the prefetch data storage based on determining that a priority of the second data item is greater than a priority of the first data item.

19. The computing system as recited in claim 18, wherein a priority of a given data item is based on an access latency of a data storage area that stores the given data item.

20. The computing system as recited in claim 15, wherein:
data storage areas targeted by the user query are embedding tables configured to store embedding vectors used by a data model implementing a neural network; and
each data item is an embedding vector.

* * * * *